United States Patent
Hymes et al.

(10) Patent No.: US 8,171,420 B2
(45) Date of Patent: May 1, 2012

(54) AUTOMATIC MANAGEMENT OF THE VISUAL SPACE WHILE PERFORMING A TASK

(75) Inventors: Charles Hymes, Pacifica, CA (US); Justin Broughton, Alameda, CA (US); Kevin McPartlan, Saratoga, CA (US); Chandra Pisupati, Mountain View, CA (US)

(73) Assignee: Intervoice, Inc., Dallas, TX (US)

( * ) Notice: Subject to any disclaimer, the term of this patent is extended or adjusted under 35 U.S.C. 154(b) by 2897 days.

(21) Appl. No.: 10/633,250

(22) Filed: Jul. 31, 2003

(65) Prior Publication Data

US 2004/0032431 A1     Feb. 19, 2004

Related U.S. Application Data

(60) Provisional application No. 60/404,076, filed on Aug. 16, 2002, provisional application No. 60/435,974, filed on Dec. 20, 2002.

(51) Int. Cl.
*G06F 3/048* (2006.01)
*G06F 3/01* (2006.01)

(52) U.S. Cl. ........ 715/779; 715/744; 715/764; 715/765; 715/810; 709/203; 709/212

(58) Field of Classification Search .......... 715/764–765, 715/744, 779, 810; 709/203, 212, 219
See application file for complete search history.

(56) References Cited

U.S. PATENT DOCUMENTS

| | | | |
|---|---|---|---|
| 5,282,243 A | 1/1994 | Dabbaghi et al. | 379/201 |
| 5,390,295 A * | 2/1995 | Bates et al. | 715/789 |
| 5,459,780 A | 10/1995 | Sand | 379/265 |
| 5,530,744 A | 6/1996 | Charalambous et al. | 379/265 |
| 5,613,068 A | 3/1997 | Gregg et al. | 395/200.13 |
| 5,825,357 A * | 10/1998 | Malamud et al. | 715/779 |
| 5,848,143 A | 12/1998 | Andrews et al. | 379/219 |
| 5,903,642 A | 5/1999 | Schwartz et al. | 379/309 |
| 5,986,657 A * | 11/1999 | Berteig et al. | 715/792 |
| 6,046,762 A | 4/2000 | Sonesh et al. | 348/16 |
| 6,049,603 A | 4/2000 | Schwartz et al. | 379/309 |
| 6,072,486 A * | 6/2000 | Sheldon et al. | 715/835 |
| 6,094,479 A | 7/2000 | Lindeberg et al. | 379/220 |
| 6,122,364 A | 9/2000 | Petrunka et al. | 379/265 |

(Continued)

FOREIGN PATENT DOCUMENTS

EP         1 016 998 A2     5/2000

(Continued)

OTHER PUBLICATIONS

"Signaling Gateway CX6100-SG", Haraski et al., pp. 138-142, NEC Res. & Develop., vol. 42, No. 2, Apr. 2001.

(Continued)

*Primary Examiner* — Nicholas Augustine

(74) *Attorney, Agent, or Firm* — Frost Brown Todd LLC; William S. Morriss

(57) ABSTRACT

A graphical user interface and method for displaying on an agent's desktop. The graphical user interface of the present invention being capable of automatically displaying, in a designated area, a managed application according to a workflow. The graphical user interface of the present invention also includes the ability to control the display of managed applications manually. Further, the graphical user interface and method of the present invention allows an Agent access to non-managed applications without restricting the agent's access to the managed applications.

5 Claims, 3 Drawing Sheets

U.S. PATENT DOCUMENTS

| | | | |
|---|---|---|---|
| 6,141,341 A | 10/2000 | Jones et al. | 370/352 |
| 6,144,667 A | 11/2000 | Doshi et al. | 370/401 |
| 6,188,673 B1 | 2/2001 | Bauer et al. | 370/252 |
| 6,188,761 B1 | 2/2001 | Dickerman et al. | 379/265 |
| 6,201,804 B1 | 3/2001 | Kikinis | 370/352 |
| 6,212,565 B1 | 4/2001 | Gupta | 709/229 |
| 6,219,648 B1 | 4/2001 | Jones et al. | 705/8 |
| 6,289,001 B1 | 9/2001 | Smyk | 370/216 |
| 6,298,383 B1 | 10/2001 | Gutman et al. | 709/229 |
| 6,301,480 B1 | 10/2001 | Kennedy, III et al. | 455/445 |
| 6,330,326 B1 | 12/2001 | Whitt | 379/265.13 |
| 6,337,858 B1 | 1/2002 | Petty et al. | 370/356 |
| 6,366,577 B1 | 4/2002 | Donovan | 370/352 |
| 6,377,568 B1 | 4/2002 | Kelly | 370/352 |
| 6,400,804 B1 | 6/2002 | Bilder | 379/76 |
| 6,434,143 B1 | 8/2002 | Donovan | 370/356 |
| 6,445,695 B1 | 9/2002 | Christie, IV | 370/352 |
| 6,448,986 B1 * | 9/2002 | Smith | 715/801 |
| 6,493,695 B1 | 12/2002 | Pickering et al. | 706/47 |
| 6,529,499 B1 | 3/2003 | Doshi et al. | 370/352 |
| 6,542,475 B1 | 4/2003 | Bala et al. | 370/271 |
| 6,574,218 B1 | 6/2003 | Cooklev | 370/352 |
| 6,577,726 B1 | 6/2003 | Huang et al. | 379/265.02 |
| 6,584,191 B1 | 6/2003 | McPartlan et al. | 379/265.02 |
| 6,600,735 B1 | 7/2003 | Iwama et al. | 370/352 |
| 6,611,590 B1 | 8/2003 | Lu et al. | 379/265.09 |
| 6,614,902 B1 | 9/2003 | Rizzetto | 379/265.11 |
| 6,615,235 B1 | 9/2003 | Copeland et al. | 709/203 |
| 6,639,982 B1 | 10/2003 | Stuart et al. | 379/266.03 |
| 6,665,395 B1 | 12/2003 | Busey et al. | 379/265.09 |
| 6,674,713 B1 | 1/2004 | Berg et al. | 370/217 |
| 6,678,265 B1 | 1/2004 | Kung et al. | 370/352 |
| 6,678,718 B1 | 1/2004 | Khouri et al. | 709/204 |
| 6,687,251 B1 | 2/2004 | Mousseau et al. | 370/401 |
| 6,697,858 B1 | 2/2004 | Ezerzer et al. | 709/224 |
| 6,704,409 B1 | 3/2004 | Dilip et al. | 379/265.02 |
| 6,704,412 B1 | 3/2004 | Harris et al. | 379/269 |
| 6,724,884 B2 | 4/2004 | Jensen et al. | 379/265.01 |
| 6,741,698 B1 | 5/2004 | Jensen | 379/265.02 |
| 6,766,377 B1 | 7/2004 | Grabelsky et al. | 370/238 |
| 6,771,765 B1 | 8/2004 | Crowther et al. | 379/265.09 |
| 6,778,494 B1 | 8/2004 | Mauger | 370/230 |
| 6,781,959 B1 | 8/2004 | Garakani et al. | 370/242 |
| 6,823,382 B2 | 11/2004 | Stone | 709/224 |
| 6,850,599 B2 | 2/2005 | Yoshitani | 379/37 |
| 6,850,613 B2 | 2/2005 | McPartlan et al. | 379/265.02 |
| 6,868,059 B1 | 3/2005 | Jones et al. | 370/216 |
| 6,937,715 B2 | 8/2005 | Delaney | 379/265.09 |
| 7,035,252 B2 | 4/2006 | Cave et al. | 370/356 |
| 7,036,087 B1 * | 4/2006 | Odom | 715/779 |
| 7,080,327 B1 * | 7/2006 | Bartz et al. | 715/821 |
| 7,085,263 B1 | 8/2006 | Fitzgerald | 370/352 |
| 7,167,899 B2 * | 1/2007 | Lee et al. | 709/204 |
| 2001/0024997 A1 | 9/2001 | Sugano et al. | 477/2 |
| 2001/0035882 A1 * | 11/2001 | Stoakley et al. | 345/779 |
| 2002/0071541 A1 | 6/2002 | Cheung et al. | 379/215.01 |
| 2003/0018702 A1 | 1/2003 | Broughton et al. | 709/202 |
| 2003/0133558 A1 | 7/2003 | Kung et al. | 379/215.01 |
| 2003/0184583 A1 * | 10/2003 | Lim | 345/738 |
| 2003/0195753 A1 | 10/2003 | Homuth | 705/1 |
| 2004/0054743 A1 | 3/2004 | McPartlan et al. | 709/206 |
| 2004/0066923 A1 | 4/2004 | Robinson | 379/166 |
| 2004/0141508 A1 | 7/2004 | Schoeneberger et al. | 370/401 |
| 2004/0221053 A1 | 11/2004 | Codella et al. | 709/231 |
| 2004/0254465 A1 * | 12/2004 | Sano et al. | 600/443 |
| 2006/0136843 A1 * | 6/2006 | Shafron | 715/826 |
| 2006/0293942 A1 * | 12/2006 | Chaddha et al. | 705/8 |
| 2007/0016915 A1 * | 1/2007 | Mukundan et al. | 719/330 |
| 2007/0050340 A1 * | 3/2007 | von Kaenel et al. | 707/3 |
| 2007/0094230 A1 * | 4/2007 | Subramaniam et al. | 706/62 |
| 2007/0106638 A1 * | 5/2007 | Subramaniam et al. | 707/3 |
| 2007/0118504 A1 * | 5/2007 | Subramaniam et al. | 707/3 |
| 2007/0204280 A1 * | 8/2007 | Mukundan et al. | 719/330 |
| 2007/0208697 A1 * | 9/2007 | Subramaniam et al. | 707/3 |
| 2007/0214145 A1 * | 9/2007 | Subramaniam et al. | 707/10 |
| 2007/0214463 A1 * | 9/2007 | Mukundan et al. | 719/330 |
| 2007/0220039 A1 * | 9/2007 | Waldman et al. | 707/102 |
| 2007/0226168 A1 * | 9/2007 | Mukundan et al. | 707/1 |
| 2007/0226709 A1 * | 9/2007 | Coker et al. | 717/140 |

FOREIGN PATENT DOCUMENTS

| | | |
|---|---|---|
| WO | WO 99/65214 | 12/1999 |
| WO | WO 01/35601 AI | 5/2001 |
| WO | WO 01/61529 A2 | 8/2001 |

OTHER PUBLICATIONS

"Media Gateway CX3200", Naoki Satoh et al., pp. 133-137, NEC Res and Develop., vol. 42, No. 2, Apr. 2001.

"Message Classification in the Call Center", by Stephan Busemann, Sven Schmeier, and Roman G. Arens. Published in Saarbrucken,Germany, pp. 158-165.

"The Modernization of a Call Center", by Karen Reasoner, University of Wyoming, Client Support Services, Information Technology, Laramie WY. 82070, pp. 270-273.

"Redefining the Call Center: Customer Service on the Internet", by D. Steul from San Francisco, Ca., pp. 38-42.

"Declaration of Kevin McPartlan", 2 pages.

Dr. D. E. Brown, "The Interaction Center Platform™", Interactive Intelligence, Apr. 6, 2001, pp. 1 of 31.

M. Taylor, "Integrated Versus Unified CTI—What's the Difference?", Interactive Intelligence, http://www.inin.com/news/presscoverage/presscoverage.asp?id=14, Aug. 2, 2001, pp. 1 of 9.

CosmoCom, "CosmoCall Universe™ Technology Overview", http://www.cosmocom.com/Productinfo/techover.htm, Aug. 2, 2001.

"Using SNMP to Manage Your Call Center More Efficiently", 2001 Aspect Communication Corporation, 12 pp.

Office Action issued against U.S. Appl. No. 11/966,393 dated Oct. 7, 2010.

Office Action dated Mar. 8, 2011 for U.S. Appl. No. 11/966,393.

* cited by examiner

AUTOMATIC MANAGEMENT OF THE VISUAL SPACE WHILE PERFORMING A TASK

RELATED APPLICATION(S)

This Patent Application claims priority under 35 U.S.C. §119(e) of the co-pending U.S. Provisional Patent Application Ser. No. 60/404,076, filed Aug. 16, 2002, and entitled "YOSEMITE ARCHITECTURE SPECIFICATION". The Provisional Patent Application Ser. No. 60/404,076, filed Aug. 16, 2002, and entitled "YOSEMITE ARCHITECTURE SPECIFICATION" is also hereby incorporated by reference in its entirety.

This Patent Application claims priority under 35 U.S.C. §119(e) of the co-pending U.S. Provisional Patent Application Ser. No. 60/435,974, filed Dec. 20, 2002, and entitled "YOSEMITE ARCHITECTURE SPECIFICATION II". The Provisional Patent Application Ser. No. 60/435,974, filed Dec. 20, 2002, and entitled "YOSEMITE ARCHITECTURE SPECIFICATION II" is also hereby incorporated by reference in its entirety.

The co-pending and co-owned U.S. patent application Ser. No. 10/327,360, filed Dec. 20, 2002, and entitled "REMOTE AGENT ACCESS METHOD TO A VOIP CONTACT CENTER WHERE HIGH QOS IS NOT SUPPORTED" is also hereby incorporated by reference in its entirety.

The co-pending and co-owned U.S. patent application Ser. No. 10/327,348, filed Dec. 20, 2002, and entitled "SCHEDULED RETURN TO QUEUE WITH PRIORITY (SRQP)" is also hereby incorporated by reference in its entirety.

The co-pending, co-owned and co-filed U.S. patent application Ser. No. 10/633,018 entitled "HIGH AVAILABILITY VOIP SUBSYSTEM" is also hereby incorporated by reference in its entirety.

The co-pending, co-owned and co-filed U.S. patent application Ser. No. 10/632,649 entitled "ESCALATED HANDLING OF NON-REALTIME COMMUNICATIONS" is also hereby incorporated by reference in its entirety.

The co-pending, co-owned and co-filed U.S. patent application Ser. No. 10/632,617 entitled "GRAPHICAL CONTROL FOR SIMULTANEOUSLY EDITING AN ARRAY OF VALUES THAT SUM TO A FIXED VALUE" is also hereby incorporated by reference in its entirety.

FIELD OF THE INVENTION

The present invention relates generally to the field of graphical user interfaces. More particularly, the present invention relates to the field of automatic graphical user interface management.

BACKGROUND OF THE INVENTION

In the latest multi-channel Contact Centers, the Agent's personal computing (PC) desktop, particularly the graphical images present of the Agent's graphical user interface has become a very congested space. Programs to control the presentation of customer contacts, agent status controls, agent performance data, and media specific controls must all compete with the Customer Relationship Management (CRM) applications for space on the desktop. Some media channels such as email and web collaboration with chat, take substantial desktop space to run. Although it is possible to expand and contract windows and/or to overlay one window with another when needed, these extra manual steps take valuable agent time and slow down call handling.

Also, many multi-channel Contact Centers currently utilize multiple CRM Applications in order to manage separate voice, e-mail, chat, etc. applications. Having multiple CRM Applications can severely clutter an Agent's PC desktop. An Agent may also be required to utilize more than one CRM Application at one time. Requiring the Agent to manually launch and use independent applications at various points within a task flow requires agent training, and introduces an opportunity for user error. Even the mental operations of deciding to launch or not launch an application introduces a mental operation that takes measurable time for an agent to perform. Further, modern Contact Center graphical user interface arrangements utilizing multiple CRM Applications tend to crowd an Agent's PC desktop so that the desktop does not include space for applications that are separate and unmanaged by the Contact Center such as a corporate e-mail and/or calendar application such as Outlook™, or any other application that is not managed by the Contact Center.

What is needed is a Graphical User Interface having a feature of visual space management that exposes a single CRM Application at the appropriate time to efficiently manage an Agent's PC desktop while also allowing the Agent access to applications not managed by the Contact Center. What is also needed is a Graphical User Interface having a feature of visual management space that exposes a CRM Application at the appropriate time that it is needed in an Agent's Workflow.

SUMMARY OF THE INVENTION

A graphical user interface and method for displaying on an agent's desktop. The graphical user interface of the present invention being capable of automatically displaying, in a designated area, a managed application according to a workflow. The graphical user interface of the present invention also includes the ability to control the display of managed applications manually. Further, the graphical user interface and method of the present invention allows an Agent access to non-managed applications without restricting the agent's access to the managed applications.

In one aspect of the present invention, a graphical user interface for displaying on an agent desktop in a contact center comprises a SHUTTERS managed display having a task bar, wherein the task bar includes at least one managed application, at least one SHUTTERS icon corresponding to each one of the at least one managed applications and a managed application display area, wherein a predetermined set of rules determines the size, placement and visibility of the at least one managed application in the managed application display area. The graphical user interface also includes an agent workflow having at least one step corresponding to each one of the at least one SHUTTERS icon, wherein one of the at least one SHUTTERS icon is selected according to the corresponding step of the agent workflow, and the managed application corresponding to the selected SHUTTERS icon is displayed in the managed application display area, a quick start bar, wherein the quick start bar includes at least one non-managed application and a contact center control panel illustrating current contact information. The graphical user interface is displayed on the agent desktop having a display and an input device. The input device is used to selectively input data in to any one of the at least one managed applications. When the agent selects any of the at least one SHUTTERS icon, the corresponding managed application is displayed in the managed application display area.

In another aspect of the present invention, a method of managing a visual space of a customer relations management application comprises displaying a SHUTTERS managed display having a task bar, wherein the task bar includes at least one managed application, displaying at least one SHUTTERS icon corresponding to each one of the at least one managed applications and displaying a managed application display area, wherein a predetermined set of rules determines the size, placement and visibility of the at least one managed application in the managed application display area. The method also includes displaying an agent workflow having at least one step corresponding to each one of the at least one SHUTTERS icon, wherein one of the at least one SHUTTERS icon is selected according to the corresponding step of the agent workflow, and the managed application corresponding to the selected SHUTTERS icon is displayed in the managed application display area, displaying a quick start bar, wherein the quick start bar includes at least one non-managed application, displaying a contact center control panel illustrating current contact information, selectively inputting data in to any one of the at least one managed applications and selecting any of the at least one SHUTTERS icon thereby displaying the corresponding managed application in the managed application display area.

In yet another aspect of the present invention, a system having a central processor, a display, a memory and an input device, a graphical user interface for displaying an agent desktop in a contact center comprises a SHUTTERS managed display having a task bar, wherein the task bar includes at least one managed application, at least one SHUTTERS icon corresponding to each one of the at least one managed applications and a managed application display area, wherein a predetermined set of rules determines the size, placement and visibility of the at least one managed application in the managed application display area. The system also includes an agent workflow having at least one step corresponding to each one of the at least one SHUTTERS icon, wherein one of the at least one SHUTTERS icon is selected according to the corresponding step of the agent workflow, and the managed application corresponding to the selected SHUTTERS icon is displayed in the managed application display area, a quick start bar, wherein the quick start bar includes at least one non-managed application and a contact center control panel illustrating current contact information. The graphical user interface is displayed on the agent desktop having a display and an input device. The input device is used to selectively input data in to any one of the at least one managed applications. When the agent selects any of the at least one SHUTTERS icon, the corresponding managed application is displayed in the managed application display area.

In yet another aspect of the present invention, a graphical user interface for displaying on an agent desktop in a contact center comprises a quick start bar, wherein the quick start bar includes at least one non-managed application, a contact center control panel illustrating current contact information, a SHUTTERS managed display having a task bar, wherein the task bar includes at least one managed application, at least one SHUTTERS icon corresponding to each one of the at least one managed applications, a managed application display area, wherein a predetermined set of rules determines the size, placement and visibility of the at least one managed application in the managed application display area and an agent workflow having at least one step corresponding to each one of the at least one SHUTTERS icon, wherein one of the at least one SHUTTERS icon is selected according to the corresponding step of the agent workflow, and the managed application corresponding to the selected SHUTTERS icon is displayed in the managed application display area. The graphical user interface is displayed on the agent desktop having a display and an input device. The input device is used to selectively input data in to any one of the at least one managed applications. When the agent selects any of the at least one SHUTTERS icon, the corresponding managed application is displayed in the managed application display area.

DETAILED DESCRIPTION OF THE PREFERRED EMBODIMENT

Figure 1:
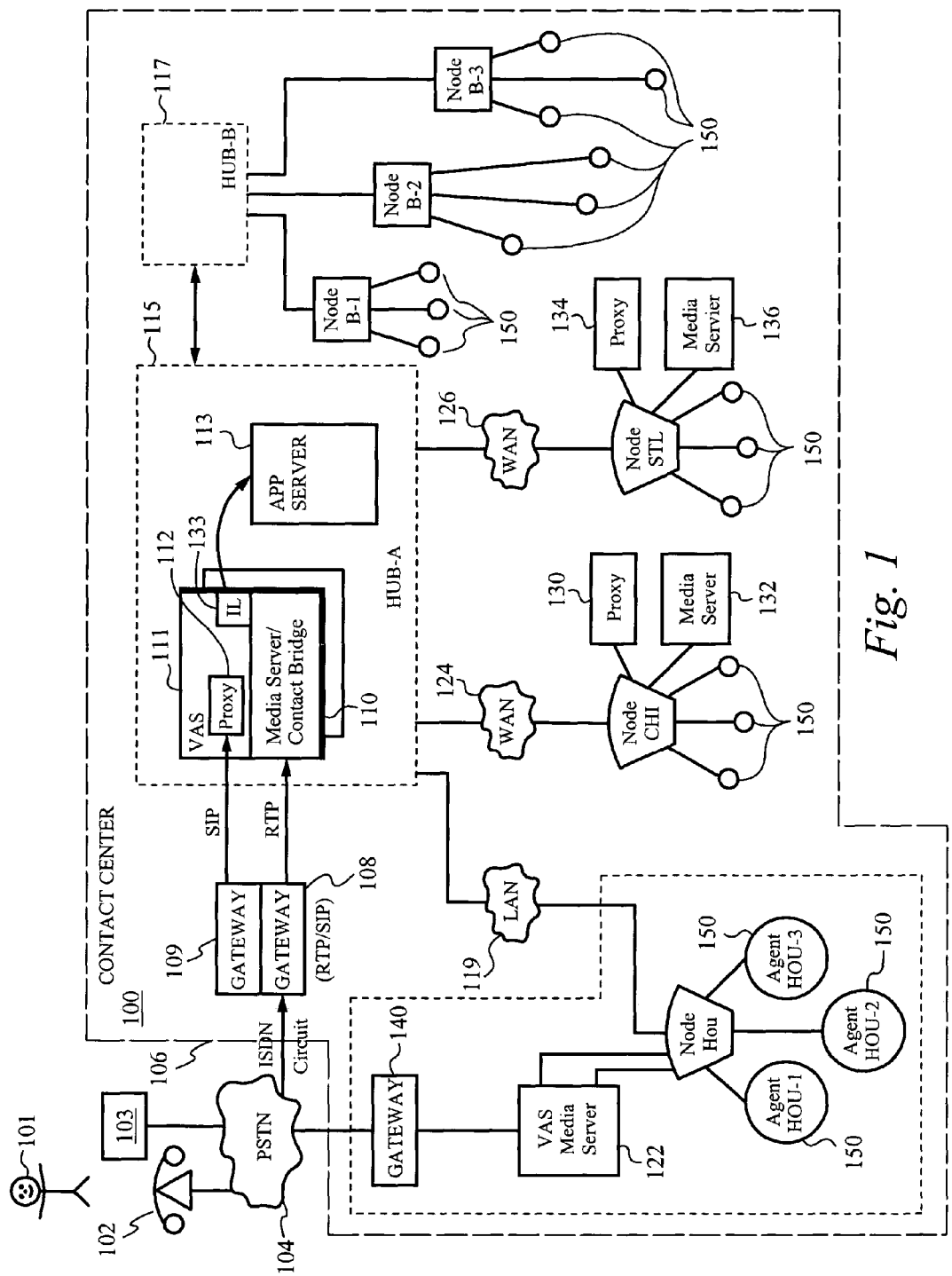
FIG. 1 illustrates a graphical representation of a Contact Center architecture of the preferred embodiment of the present invention.
Figure 2:
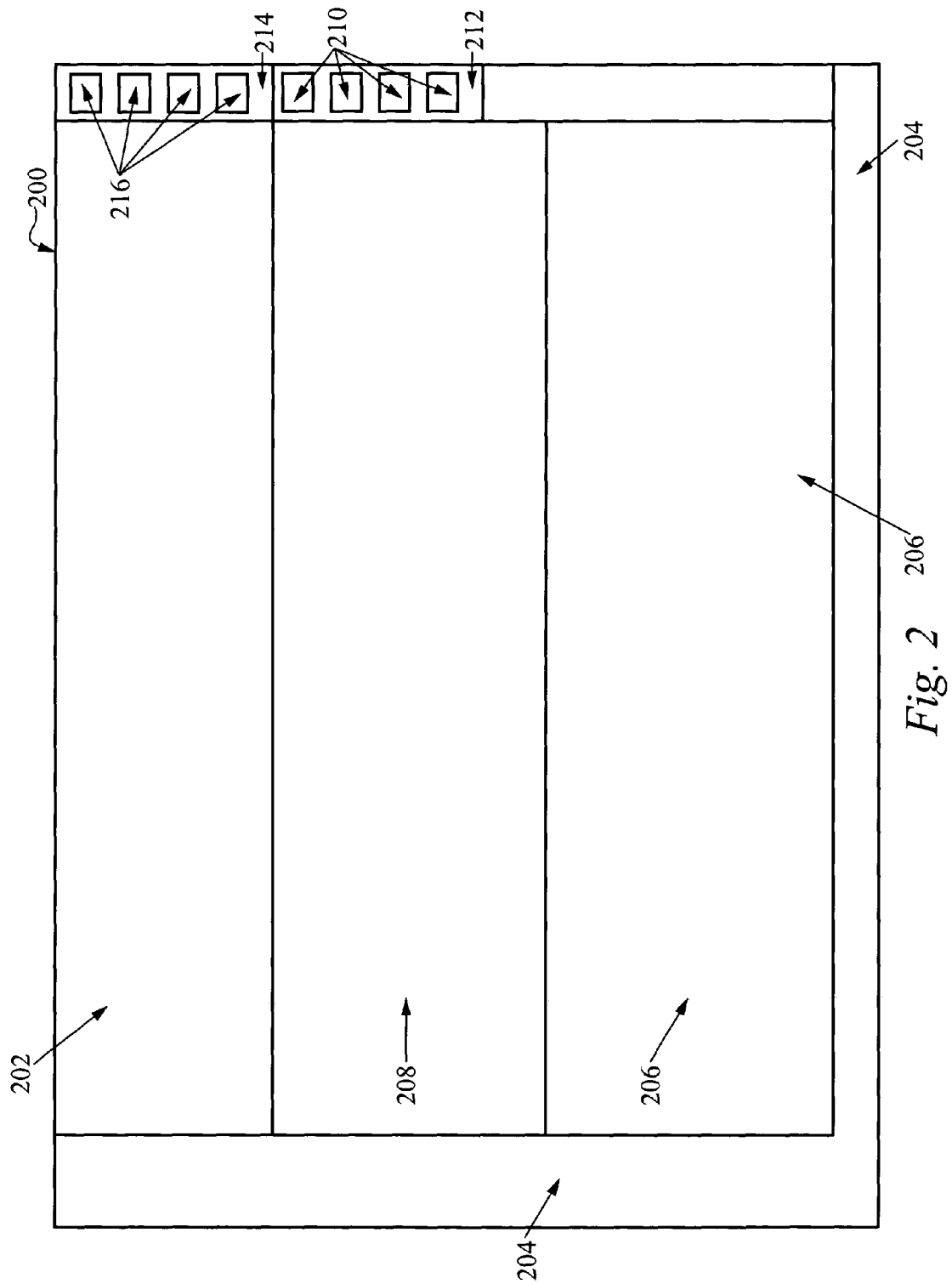
FIG. 2 illustrates a graphical user interface of the preferred embodiment of the present invention.

Referring to FIG. 1 and FIG. 2, the invention includes a Graphical User Interface 200 for use in a Contact Center 100 to control the use of an Agent's 150 screen space automatically during the normal course of an Agent 150 interacting with a contact. The Contact Center 100 includes a number of Gateways 108, 109 coupling a PSTN 104 to a Contact Center 100 having a "Hub and Node" architecture. Agents 150 are coupled to various Nodes (HOU, CHI, STL, B-1, B-2, B-3) and utilize the Graphical User Interface 200 which will be discussed herein. The details concerning the Contact Center 100 architecture are disclosed in a co-owned and co-pending U.S. patent application Ser. No. 10/632,615 filed on Jul. 31, 2003 and entitled "CONTACT CENTER ARCHITECTURE." The U.S. patent application Ser. No. 10/632,615 entitled "CONTACT CENTER ARCHITECTURE" is also incorporated by reference in its entirety. Of course, it will be readily apparent to one skilled in the art that alternative embodiments of the present invention disclosed in the following specification can and will be utilized in VoIP networks other than the Contact Center 100 as incorporated by reference above or in other applications not related to contact center management having a graphical user interface.

Figure 3:
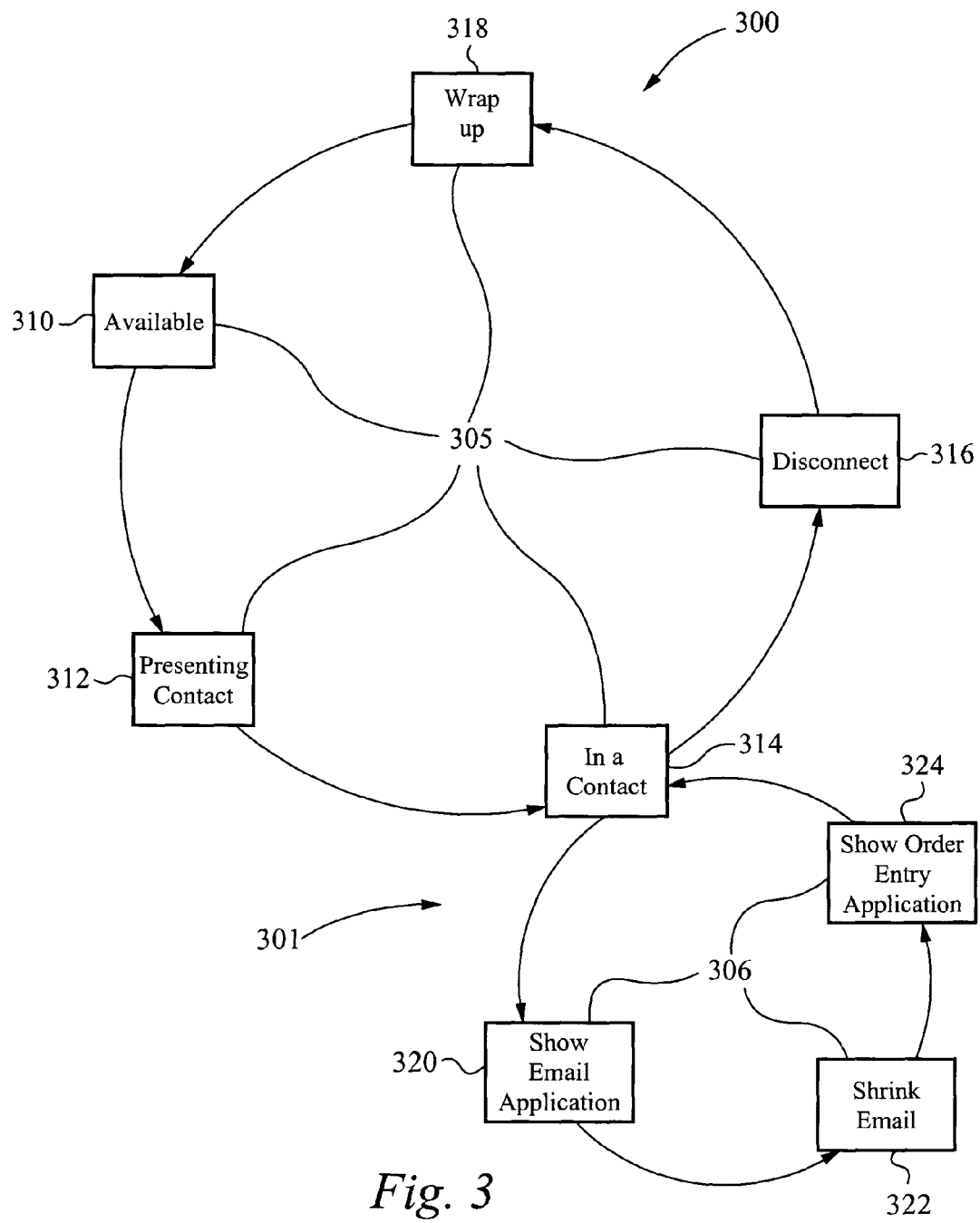
FIG. 3 illustrates a graphical representation of an Agent Workflow of the preferred embodiment of the present invention.

Referring to FIGS. 1-3 simultaneously, generally the Task bar 212 and SHUTTERS Icons 210 are a feature of the Contact Center 100 implemented in an Agent's 150 Graphical User Interface 200 in order to manage a large part of the usable Graphical User Interface 200, particularly the SHUTTERS Managed Display Area 206 of the Graphical User Interface 200 in concert with the Agent's 150 work state defined by the Agent Workflow 300 and the Contact Workflow 301. The term SHUTTERS is a federally registered trademark (Registration No. 2,882,260) and generally refers to the manipulation of software applications (i.e., opening, closing, resizing, etc.) as described herein. The Contact Center 100 controls the progress of a contact from its initial presentation to its ultimate completion at the Agent's 150 desktop through the use of the Agent Workflow 300 and the Contact Workflow 301. This Contact Center 100 information is illustrated in the Contact Center Control Panel 202 of the Graphical User Interface 200. The Agent Workflow 300 may include a number of various states, depicted in FIG. 3 as Agent Steps 305, such as Available 310, Presenting a Contact 312 of a specific media type, In a Contact 314, Disconnect 316 and Wrap Up 318. These Agent Steps 305 all can be enhanced by adding Agent Steps 305 or deleting Agent Steps 305 to trigger desired behavior of the Graphical User Interface 200. The Contact Workflow 301 may include a number of various states, depicted in FIG. 3 as Contact Steps 306, such as Show Email Application 320, Shrink Email 322 and Show Order Entry Application 324. Likewise, these Contact Steps 306 all can be enhanced by adding Contact Steps 306 or deleting contact Steps 306 to trigger desired behavior of the Graphical User Interface 200.

In this implementation, applications such as the customer's CRM are put on a list of managed applications or "CRM Applications", each CRM Application's visual experience is controlled by the Task bar 212, and its corresponding SHUTTERS Icon 210. The Task bar 212 sends messages to the windowing system to reveal, hide and reposition SHUTTERS Managed Applications 208, and intercepts and reinterprets all windowing messages sent via the windowing system that would otherwise control the size, visibility and location of the SHUTTERS Managed Applications 208. The Task bar 212 may or may not have a visual representation on the Desktop 204. In a preferred embodiment, when a contact arrives to the corresponding Contact Step 306 in the Contact Workflow 301, the Contact Workflow 301 can specify which SHUTTERS Managed Application 208 is to be opened for viewing and positioned to the current contact's records in the SHUTTERS Managed Display Area 206. This combines a traditional CRM "screen pop" with the management of the Graphical User Interface 200 at the same time. In alternative embodiments, when the Agent 150 arrives to the corresponding Agent Step 305 in the Agent Workflow 300, the Agent Workflow 300 can specify which SHUTTERS Managed Application 208 is to be opened for viewing and positioned in the SHUTTERS Managed Display Area 206. Also in alternative embodiments, SHUTTERS Managed Applications 208 can also be configured by the contact center administrator to open in a separate window. Such a configuration is often desired when a contact center utilizes a high number of managed applications. Any number of the managed application may be configured in this manner as desired by the contact center administrator. When a SHUTTERS Managed Application 208 is launched in or opened either manually or by an Agent or Contact Workflow 300, 301, a corresponding SHUTTERS Icon 210 appears in the Task bar 212. When a SHUTTERS Managed Application 208 is closed, either manually or by an Agent or Contact Workflow 300, 301 its corresponding SHUTTERS Icon 210 disappears from the Task bar 212.

Still referring to FIG. 2 and FIG. 3, when the data entry is finished in the CRM Application of the opened SHUTTERS Managed Application 208, the Agent or Contact Workflow 300, 301 can be set to minimize the CRM Application and expand another SHUTTERS Managed Application 208 application according to the current Agent or Contact Step 305, 306 of the Agent or Contact Workflow 300, 301 in handling the customer, as long as the subsequent CRM Application was also registered for control by SHUTTERS Managed Applications 208. Similarly, if an email is escalated to an immediate contact, the email client under control of the SHUTTERS Managed Application 208 can expand and display the escalated email. After an email is sent, the CRM Application can automatically contract, and possibly expand another application where customer status is entered. If the Agent 150 is using this Graphical User Interface 200 and needs access to a CRM Application out of sequence with the pre-programmed Agent or Contact Workflow 300, 301, SHUTTERS Icons 210 exist in the Task bar 212 to permit manual control of the expansion and contraction of the SHUTTERS Managed Applications 208. Additionally, if at any time the Agent 150 wishes to work with an application that is not controlled by SHUTTERS Managed Applications 208, commonly referred to as a "non-managed" applications, the Desktop 204 is always active and visible. However, the use of non-managed applications may overlay the SHUTTERS Managed Display Area 206.

Still referring to FIGS. 1-3, the CRM Applications having SHUTTERS Managed Applications 208 that are expanded and contracted in the SHUTTERS Managed Display Area 206 can vary depending on the next Agent or Contact Step 305, 306 of the Agent or Contact Workflow 300, 301. For example, if the Agent 150 can handle both sales and service calls but the customer has already specified that they are making a service call, perhaps by calling a service number or selecting it from a menu, the Agent Workflow 300 knows that the service management CRM Application is what should be opened to the correct contact record. Similarly, if certain events happen during the course of the call, the Contact Workflow 301 can cause other SHUTTERS Managed Applications 208 to open, causing its corresponding CRM Application to open in the SHUTTERS Managed Display Area 206. Therefore, it is the logic of the Agent or Contact Workflow 300, 301 that decides which CRM Applications will be open at what times and how they are sequenced for any particular Agent or Contact Step 305, 306 of the Agent or Contact Workflow 300, 301.

Referring now to FIG. 2, a Graphical User Interface 200 is displayed on an Agent's 150 PC desktop in order to organize non-managed applications as well as managed [CRM] Applications in an Agent's 150 Agent or Contact Workflow 300, 301 (FIG. 3). The PC desktop may display the Graphical User Interface 200 on viewing devices including a cathode ray tube (CRT) monitor, a liquid crystal display, a flat panel monitor, etc., or any display device allowing an Agent 150 to view the Graphical User Interface 200 and interact accordingly. In a preferred embodiment, the Graphical User Interface 200 is 1,280 wide and 1,024 pixels high or larger. However, additional embodiments may include Graphical User Interfaces 200 of various dimensions. The Contact Center Control Panel 202 illustrates the pertinent Contact Center 100 information.

Still referring to FIG. 2, the Contact Center Control Panel 202 is configured at the top of the Graphical User Interface 200 and extends to the Desktop 204. Again, additional embodiments may include variations of this configuration. The Contact Center Control Panel 202 includes the status of multichannel control calls entering the Graphical User Interface 200. Such control calls include voice channels, e-mail, web collaboration and chat. Channels may be deleted or added as desired. The Contact Center Control Panel 202 also may include information as to how to greet an incoming contact as what language the contact uses, a particular interest that customer has had previously purchased, whether that customer is a "VIP" customer, etc. Any information concerning how to greet a particular customer is included in the Contact Center Control Panel 202.

The Desktop 204 presents the non-managed applications that may be accessed by an Agent 150 while using the Graphical User Interface 200. Preferably the Desktop 204 is located on the left edge of the Graphical User Interface 200 with a strip extending along the bottom of the Graphical User Interface 200 as depicted in FIG. 2. Of course, dimensional variations of the Desktop 204 may be realized in additional embodiments of the Graphical User Interface 200. The non-managed applications included in the Desktop 204 are not found in the Agent or Contact Workflow 300, 301 (FIG. 3). Rather, the non-managed applications include those applications that an Agent 150 may choose to use outside and separate from handling contacts. These applications will often include applications that are packaged with the operating system as well as corporate e-mail applications and calendaring applications such as Outlook™ In the current embodiment, a quick start bar 214 is provided that includes Application Icons 216 for both managed and unmanaged applications. If these Application Icons 216 are selected, then the corresponding application is launched. If the application is a SHUTTERS Managed Application 208, then its window will be managed within the SHUTTERS Managed Display Area 206.

Referring still to FIG. 2, the design of the Graphical User Interface 200 allows the nonmanaged applications in the Desktop 204 to be accessed at any time. Accessing an application in the Desktop 204 may cause that application to overlay the Graphical User Interface 200 as depicted here in FIG. 2. Because one window can overlay another without closing or shrinking, such a non-managed application must be overlaid, shrunk or closed down before the Agent 150 may again access the remainder of the Graphical User Interface 200, including the Contact Center Control Panel 202, the SHUTTERS Managed Display Area 206, the SHUTTERS Managed Applications 208 and the SHUTTERS Icons 210.

The SHUTTERS Managed Display Area 206 illustrates the current Agent or Contact Step 305, 306 of the Agent or Contact Workflow 300, 301 of the Agent 150 and, if one is being accessed, the current CRM Application. In a preferred embodiment, the SHUTTERS Managed Display Area 206 is typically about 1024 pixels wide and 768 pixels tall as depicted in FIG. 2. Again, additional embodiments may include a SHUTTERS Managed Display Area 206 having modified dimensions. Each one of the SHUTTERS Controlled Applications 208 are assigned an Agent or Contact Step 305, 306, and in some cases, a CRM Application. The CRM Applications controlled by the SHUTTERS Managed Applications 208 must be assigned prior to operating the Graphical User Interface 200. The CRM Applications, also referred to as managed applications, may include an order entry application, a trouble ticket application, an email application or a web collaboration application. The list of possible CRM Applications is virtually endless and those designated as Agent or Contact Steps 305, 306 in the Agent or Contact Workflow 300, 301 (FIG. 3) will be assigned a SHUTTERS Icon 210.

Still referring to FIG. 2, while referring to FIG. 3, in the preferred embodiment when an Agent 150 arrives at any Contact Step 306 in the Contact Workflow 301, the SHUTTERS Managed Application 208 corresponding to the CRM Application found in that particular Contact Step 306 will open up, allowing the Agent 150 to access that CRM Application in the SHUTTERS Managed Display Area 206. In the event that an Agent 150 wishes to open a particular SHUTTERS Managed Application 208 that does not currently represent the current Contact Step 306 in the Contact Workflow 301, the Agent 150 may select any one of the SHUTTERS Icons 210, opening the attached SHUTTERS Managed Application 208, thereby opening the corresponding CRM Application into the SHUTTERS Managed Display Area 206. Likewise, the Agent 150 may minimize the SHUTTERS Managed Application 208 by selecting the appropriate SHUTTERS Icon 210.

In a preferred embodiment, SHUTTERS Managed Applications 208 will "share" the space of the SHUTTERS Managed Display Area 206. Each SHUTTERS Managed Application 208 is allocated all of the required horizontal space, and the remaining vertical space is split up and shared between them as described below. Application focus may be directed to a specific SHUTTERS Managed Application 208 according to the Contact Workflow 301, or manually specified by the Agent 150 by whatever focus shifting mechanisms the windowing system provides. Typically, this includes clicking with the mouse, or by using keyboard shortcuts. In this way, the Agent 150 has simultaneous access to all of the SHUTTERS Managed Applications 208. Such an embodiment allows an Agent 150 to work on multiple CRM Applications at the same time.

The percent of utilization of the SHUTTERS Managed Display Area 206 may be automatically allocated on an even percentage basis or it may be specifically controlled such as one-third given to email and two-thirds given to a CRM Application. When multiple applications appear, the SHUTTERS Icons 210 still allow an Agent 150 to fully expand or contract any SHUTTERS Managed Applications 208 within the SHUTTERS Managed Display Area 206. Furthermore, when multiple applications appear, an Agent 150 may assign a minimum vertical space for each SHUTTERS Managed Application 208 such that when any particular SHUTTERS Managed Application 208 is selected, the non-selected SHUTTERS Managed Applications 208 will resize to allow the selected SHUTTERS Managed Application 208 to be displayed with the assigned minimum vertical height. It should also be noted that any managed application may include a standard scroll bar when the managed application is larger than the allotted space given to that managed application in the SHUTTERS Managed Display Area 206.

Referring now to FIG. 2 and FIG. 3, typical Agent and Contact Workflows 300, 301 are depicted. These Agent and Contact Workflows 300, 301 are typical as they show one possible representative model of Agent and Contact Workflows 300, 301 that may be modified by adding or deleting any number of Agent and Contact Steps 305, 306 depending upon the needs of the Contact Center 100. In this particular Agent Workflow 300, when an Agent 150 receives a Contact 314, the Agent Workflow 300 sends a message to the Task bar 212 to open a SHUTTERS Managed Application 208 (typically the CRM) to display the detailed contact information. The Task bar 212 determines the size, and placement of the window for the SHUTTERS Managed Application 208, and sends the appropriate messages to the Windowing system. The windows are then displayed in the SHUTTERS Managed Display Area 206. If the Agent 150 accepts the Contact 314, then the Contact Workflow 301 sends a message to the Task bar 212 to open a SHUTTERS managed Application 208 such as an Email Application 320 that allows the Agent 150 to communicate via the appropriate medium.

Alternatively, when an Agent 150 becomes available to handle contacts of a particular media type, the Contact Workflow 301 sends a message to the Task bar 212 to open a SHUTTERS Managed Application 208 in the SHUTTERS Managed Display Area 206, that allows the Agent 150 to communicate via the appropriate medium. The Task bar 212 determines the size, and placement of the window for the SHUTTERS Managed Application 208, and sends the appropriate messages to the Windowing System. When the Agent 150 is presented with a new contact, the Contact Workflow 301 sends a message to the Task bar 212 to open a SHUTTERS Managed Application 208 to display the detailed contact information. If the Agent 150 accepts the Contact 314, the Contact Workflow 301 sends a message to the Task bar 212 to open a SHUTTERS Managed Application 208 to best process the issues of that contact.

Still following the Contact Workflow 301 in FIG. 3, when the Agent 150 is done communicating with the contact in the email application, the application will minimize or close as shown in the Shrink Email 322 step. The Agent 150 may then wish to move to the Show Order Entry Application 324 before Disconnect 316 and Wrap Up 318. Again, at every Agent or Contact Step 305, 306 in the Agent or Contact Workflow 300, 301, the Agent or Contact Workflow 300, 301 sends a message to the Task bar 212 to manage a SHUTTERS Managed Application 208. The CRM Application will open as long as the Agent or Contact Workflow 300, 301 includes a corresponding Agent or Contact Step 305, 306 and a SHUTTERS Controlled Application 208 is assigned to that Agent or Contact Step 305, 306.

The present invention has been described in terms of specific embodiments incorporating details to facilitate the understanding of the principles of construction and operation of the invention. Such reference herein to specific embodiments and details thereof is not intended to limit the scope of the claims appended hereto. For example this concept can be implemented in any task-based environment that uses a graphical user interface. It will be apparent to those skilled in the art that modifications can be made in the embodiment chosen for illustration without departing from the spirit and scope of the invention.

What is claimed is:

1. A graphical user interface displayed on an agent desktop in a contact center, comprising:
    a quick start bar, wherein the quick start bar includes one or more icons for identifying non-managed applications;
    a contact center control panel presenting current contact information, wherein the information indicates a type of call placed by the current contact to the contact center;
    a managed display having a task bar, wherein the task bar includes one or more icons for identifying managed applications;
    managed application display area, wherein a predetermined set of rules determines the size, placement and visibility of a managed application in the managed application display area; and
    an automated workflow defining a plurality of steps for controlling an agent's handling of the current contact and having at least one step corresponding to each one of the one or more icons,
    wherein one of the one or more icons is selected according to the corresponding step of the automated workflow and the type of call indicated by the contact center control panel, and the managed application identified by the selected icon is displayed in the managed application display area, further wherein the managed application identified by the selected icon is selectively displayed in a separate window.

2. The graphical user interface as claimed in claim 1 wherein the agent desktop has a display and an input device.

3. The graphical user interface as claimed in claim 2 wherein the input device is used to selectively input data into any one of the least one managed applications.

4. The graphical user interface as claimed in claim 3 wherein when the agent selects any of the one or more icons, the managed application identified by the selected icon is displayed in the managed application display area.

5. The graphical user interface as claimed in claim 3, wherein the type of call is selected from the group consisting of: voice, e-mail, web collaboration, and chat.

* * * * *